United States Patent [19]
Abramson

[11] Patent Number: 5,784,639
[45] Date of Patent: Jul. 21, 1998

[54] LOAD BUFFER INTEGRATED DYNAMIC DECODING LOGIC

[75] Inventor: Jeffrey M. Abramson, Aloha, Oreg.

[73] Assignee: Intel Corporation, Santa Clara, Calif.

[21] Appl. No.: 581,028

[22] Filed: Dec. 29, 1995

[51] Int. Cl.$^6$ .................................................. G06F 12/08
[52] U.S. Cl. .................... 395/800.23; 395/376; 395/392
[58] Field of Search ............................. 395/800.23, 392, 395/376, 308, 800.24, 407

[56] References Cited

U.S. PATENT DOCUMENTS

| | | | |
|---|---|---|---|
| 5,191,649 | 3/1993 | Cadambi et al. | 395/200.55 |
| 5,261,071 | 11/1993 | Lyon | 395/467 |
| 5,280,615 | 1/1994 | Church et al. | 395/674 |
| 5,420,990 | 5/1995 | McKeen et al. | 395/392 |
| 5,420,991 | 5/1995 | Konigsfeld et al. | 395/477 |
| 5,467,473 | 11/1995 | Kahle et al. | 395/800.23 |
| 5,481,679 | 1/1996 | Higaki et al. | 395/308 |
| 5,588,126 | 12/1996 | Abramson et al. | 395/376 |
| 5,606,670 | 2/1997 | Abramson et al. | 395/481 |
| 5,625,835 | 4/1997 | Ebcioglu et al. | 395/800.24 |
| 5,664,137 | 9/1997 | Abramson et al. | 395/392 |
| 5,666,506 | 9/1997 | Hesson et al. | 395/392 |
| 5,694,574 | 12/1997 | Abramson | 395/467 |

OTHER PUBLICATIONS

Johnson, Mike;Superscalar Microprocessor Design; Prentice Hall, Inc., New Jersey, 1991.

Popescu, Val; Schultz, Merle; Spracklen, John; Gibson, Gary; Lightner, Bruce; Isaman, David, "The Metaflow Architecture", IEEE Micro, Jun. 1991, pp. Nos. 10–13 and 63–73.

*Primary Examiner*—Larry D. Donaghue
*Attorney, Agent, or Firm*—Blakely, Sokoloff, Taylor & Zafman

[57] ABSTRACT

A novel method to quickly decode a block-code in a load buffer and compare it against multiple wake-up signals in an out-of-order processor. A block-code is used to describe the blocking condition that prevents a load operation from being dispatched. Each wake-up signal indicates that the blocking conditions corresponding to certain block codes have been resolved. For each entry in the load buffer, a dynamic decoder decodes the block-code and a compare logic determines if the wake-up signal corresponding to the block-code is active. If the wake-up signal corresponding to the block-code is active, the load entry is marked ready for dispatch. Since, the blocking conditions may change each clock cycle, the decode and compare should be done each clock cycle to achieve optimal performance. Faster decode and compare may permit higher clock frequencies if the processor is limited by the decode and compare.

14 Claims, 5 Drawing Sheets

LOAD BUFFER INTEGRATED DYNAMIC DECODING LOGIC

BACKGROUND OF THE INVENTION

1. Field of the Invention

The present invention relates to the field of computer systems; more particularly, the present invention relates to performing load operations in a computer system.

2. Description of Related Art

Some computer systems have the capabilities to execute instructions out-of-order. In other words, the central processing unit (CPU) in the computer system is capable of executing one instruction before a previously issued instruction. This out-of-order execution is permitted when there is no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and its relationship to speculative execution of instructions is well-known in the art. For a detailed explanation of speculative out-of-order execution, see M. Johnson, *Superscalar Microprocessor Design*, Prentice Hall, 1991. Speculative and out-of-order execution offer advantages over the non-speculative and in-order execution, including better use of resources. If multiple instructions are permitted to be executed at the same time, this performance benefit greatly increases.

Special considerations exist with respect to performing memory operations out-of-order in a computer system. Memory operations are ordered to ensure that the correct data is being transferred. For instance, if a store operation and a load operation have the same destination and source addresses, respectively, and the store operation precedes the load operation in the instruction stream, then the store operation must occur before the load operation to ensure the correct data will be subsequently loaded. If the load operation is allowed to be completed before the store operation, then the data loaded may not be the data that the store operation would have stored at the memory location. By using stale data, the computer system will not function as intended by the ordered sequence of instructions. However, out-of-order and concurrent execution of instructions may be very beneficial. Thus, it would be advantageous to execute memory operations out-of-order and concurrently except where their execution would create incorrect results.

Memory order buffers (MOBs) are used to store multiple pending load and store operations. Some MOBs include load buffers that store the pending load operations. A load buffer comprises multiple load buffer entries. Each load buffer entry can contain information associated with a corresponding pending load operation. Logic is required to determine when the load operation may be executed based on considerations such as address conflicts with store operations. The speed at which the logic determines whether a conflict has been resolved helps improve the latency between conflict resolution and the execution of a load instruction that was dependent on that conflict resolution. Since conflicts may be resolved in each clock cycle, the speed at which the logic determines whether a conflict has been resolved helps improve the execution speed of load instructions that are dependent on conflict resolutions.

However, speed often comes at the cost of device area. It is well-known in the art that the cost of a semiconductor device is directly related to the area it consumes. Therefore, it is desireable to efficiently use device area.

What is needed is a method and apparatus to more quickly determine which pending loads in the load buffer may be executed while efficiently using device area.

SUMMARY OF THE INVENTION

A method and apparatus for dispatching load operations in a computer system is described. The present invention includes a method and apparatus for determining when a load operation in an out-of-order processor is ready for dispatch. A dynamic decoder is used to decode a block-code and the decoded signals are compared against corresponding wake-up signals which indicate that a blocking condition is resolved. The method and apparatus of the present invention provides a faster determination of the ready signal while making efficient use of device area.

DETAILED DESCRIPTION

A method and apparatus for performing load operations is described. In the following detailed description of the present invention numerous specific details are set forth, such as a specific number of bits for block codes, specific number of wake-up signals, specific blocking conditions, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid unnecessarily obscuring the present invention.

When out-of-order memory operations are performed in a computer system, some load operations may be blocked from completion while prior and subsequent load and store operations are completed. A load operation is initially dispatched into the memory subsystem for execution in the computer system. A test then determines whether there are any conflicts that might exist between the load operation and previously dispatched store operations (address dependencies) and whether a resource required for execution of the load operation is currently in use or unavailable (resource dependencies). If a dependency or other conflict is identified, the load is temporarily prevented, or "blocked", from completion for a predetermined period of time (e.g., the current cycle). The block information is prioritized to produce a block code. Block codes corresponding to load operations are stored in a load buffer indicating a condition that will allow each blocked load to be dispatched.

The present invention is a method and apparatus for determining when a blocked load operation in an out-of-order processor is ready for dispatch. Wake-up signals correspond to various events that will cause some blocked loads to be dispatched. Wake-up logic snoops a set of wake-up signals and compares them to the block codes in the load buffer and changes load buffer entries from blocked to "ready" if the block code corresponds to an asserted wake-up signal. In the present invention, the wake-up logic includes a dynamic decoder to decode each block-code and compare logic to compare the decoded signals to the corresponding wake-up signals. When the wake-up signal that corresponds to a block code is asserted, blocked loads with the block-code are marked as ready for dispatch. The load operation is then scheduled to be dispatched to memory. Scheduled loads dispatch and execute or block again, if another blocking condition occurs. Since the blocking conditions may change every cycle, the wake-up signals should be snooped every cycle to reduce the response latency. When the snooping is done every cycle, it is important that it be done as quickly as possible in order to complete snoops in the short cycle times of microprocessors that operate at high frequencies. In one embodiment, additional conditions may be required in order to mark a blocked load as "ready."

Particular conditions for blocking load operations, asserting wake-up signals, and marking loads as "ready" are not discussed in detail in order to avoid obscuring the present invention. In addition, the memory order buffer (partially described below) is not described completely in order to avoid obscuring the present invention. See U.S. Pat. No. 5,694,574, titled "Method and Apparatus for Performing Load Operations in A Computer System," filed Jan. 4, 1994, by Abramson, et al. for a more detailed description of block codes, wake-up signals, and the memory order buffer.

Figure 1:
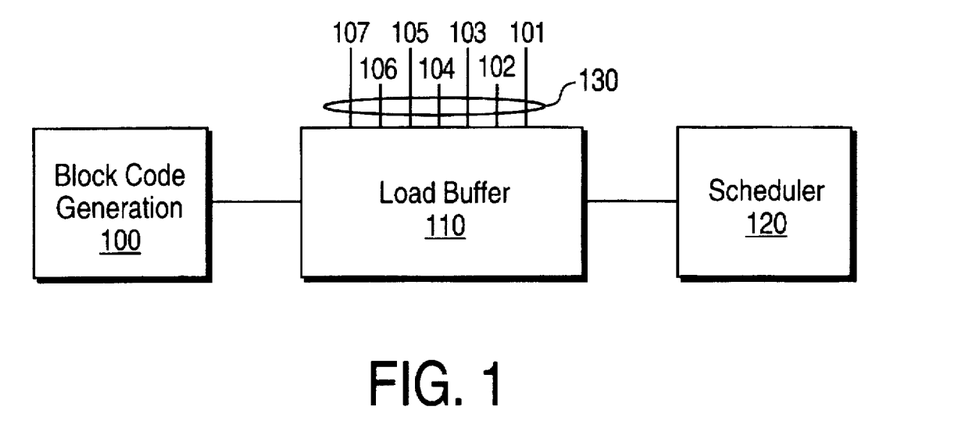
FIG. 1 illustrates one embodiment of a portion of the memory order buffer of the present invention.

FIG. 1 illustrates one embodiment of a portion of the memory order buffer of the present invention. A block code generation logic 100 is coupled to a load buffer 110 which is coupled to scheduler 120. For each dispatched load, the block code generation logic 100 receives blocking information, if any, from other portions of the processor indicating blocking conditions such as an address conflict with a prior pending store or a resource conflict with a prior pending store or load operation such that a resource, such as the data cache, cannot process the load at that time. When multiple blocks are received, the block code generation logic 100 selects one block code according to a priority system. The load buffer 110 contains multiple load entries, each corresponding to a load operation. A block code is stored with each load entry having a blocked load to indicate which blocking condition is to be resolved for redispatch. Each of the wake-up signals 130 are input to the load buffer 110 to indicate when certain blocking conditions are resolved. When the blocking condition corresponding to a blocking code is resolved, the load entry containing that block code is marked as "ready" for dispatch. Multiple load entries may be marked as ready for dispatch at one time. The scheduler 120 prioritizes which of the loads ready for dispatch will be dispatched when the processor is not capable of dispatching all the ready loads in a particular cycle.

Figure 2:
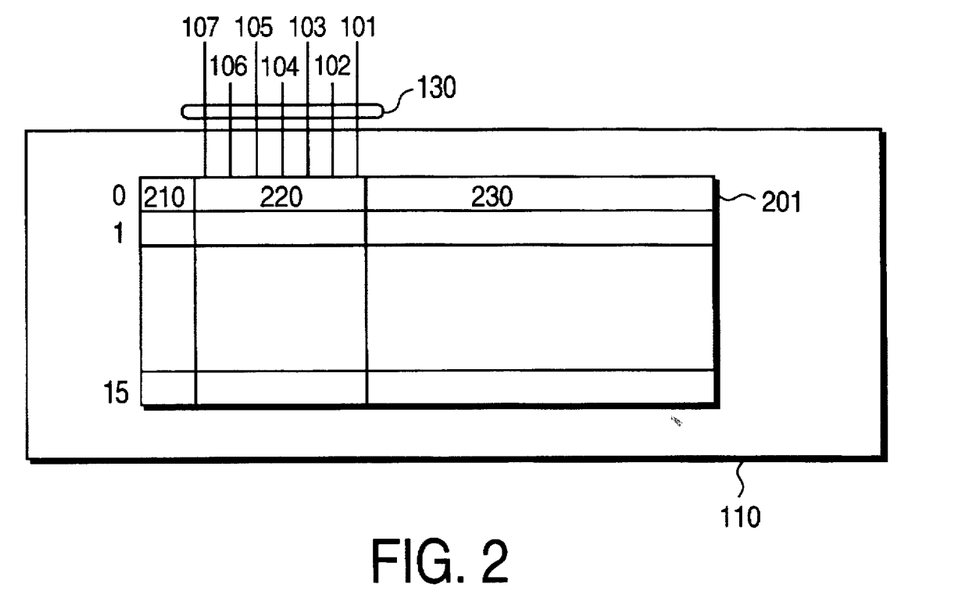
FIG. 2 illustrates one embodiment of a load buffer of the present invention.

FIG. 2 illustrates one embodiment of the load buffer 110. In one embodiment, the load buffer 110 comprises 16 load entries. One skilled in the art will recognize that more or less load entries may be implemented in the load buffer. Wake-up signals 130 are coupled to the load buffer 110. Each load-buffer entry 201 in the load buffer 110 includes a ready cell 210, a block code and wake-up logic cell 220, and load information 230. The ready cell 210 contains a bit which indicates whether the load is ready for dispatch. The block-code and wake-up logic cell 220 receives the wake-up signals 130. The block-code and wake-up logic cell 220 contains the block-code and wake-up logic to compare the block-code to the active wake-up signals 130. The load information 230 contains other information for processing the load once it is dispatched. This might include, for example, address and data size of the load. The load information 230 may also contain information such as valid and completed bits to indicate whether a load buffer entry is valid and completed, respectively.

In the following three embodiments of a block-code and wake-up logic cell 220, a three bit block-code is used and seven wake-up signals are used. One skilled in the art will recognize that other block-code sizes and more or less wake-up signals may be used. The signals described in this application are described to be "high" when they are a logical one and "low" when they are a logical zero. A conditional signal is defined to be "active" when its condition is true and "inactive" when its condition is untrue. In addition, a signal name and a corresponding NOT signal name are defined to be logical complements in this application. For example, if a TEST signal is active (high) to indicate that a condition is true, the NOT TEST signal is active (low) to indicate that the condition is true. Similarly, if the TEST signal is inactive (low) to indicate that a condition is false, the NOT TEST signal is inactive (high) to indicate that a block-code is false. A signal is defined to be asserted when that signal is driven active.

Figure 3:
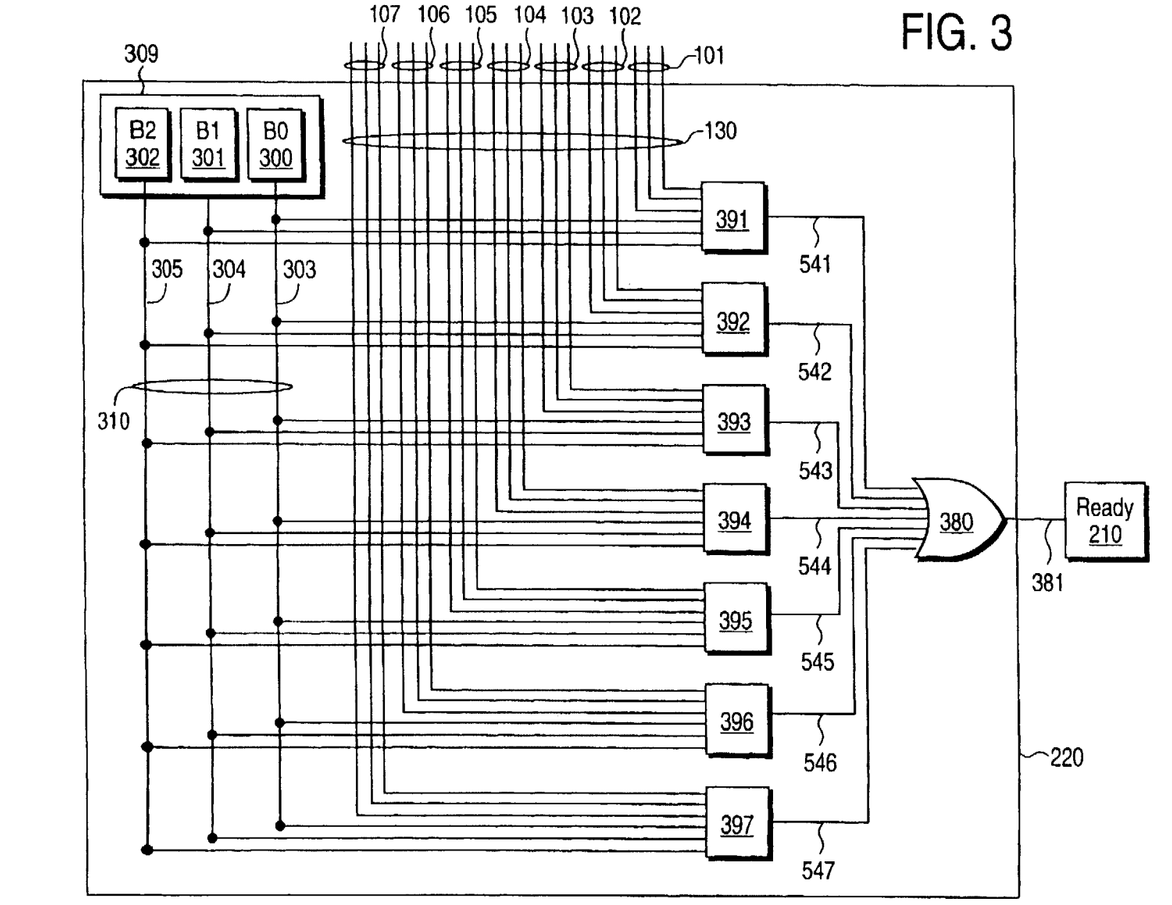
FIG. 3 illustrates one embodiment of wake-up logic using a decoder and AND gates to compare wake-up signals with the decoded block code.

FIG. 3 illustrates one-embodiment of a wake-up logic. In this embodiment, the block code memory 309 contains bit cells 300-302, which store a three bit representation of the block code for that load entry. The bit cells 300-302 are coupled to corresponding bit busses 303-305 which are collectively described as a block-code bus 310. The value stored in a memory cell is driven onto the corresponding bit bus. For example, when bit cell 300 contains a zero, a zero will be driven onto the bit bus 303. The bit busses 303-305 are coupled to compare circuits 391-397. Each of the wake-up signals 101-107 are represented by three bits corresponding to the block-code that they "awaken". These wake-up signals 101-107 are coupled to corresponding compare circuits 391-397. Each of the compare circuits 391-397 contains logic to determine if a wake-up signal matches the block-code. The design of such compare circuits are well-known in the art. Each of the compare circuits 391-397 drives a corresponding one of the MATCH busses 541-547 which indicates that the corresponding wake-up signal matches the block-code. The MATCH busses 541-547 are input to OR gate 380 which drives a ready signal onto the ready bus 381. The ready bus 381 is coupled to the ready cell 210 such that the status of the ready cell indicates that the load entry is ready for dispatch if the ready signal is asserted.

An advantage of the embodiment illustrated in FIG. 3 is that the relative speed at which the ready signal may be determined. The total delay is approximately 3 gate delays (2 gate delays for the compare logic and 1 gate delay for the OR gate). However, a disadvantage of this design is that there are three bitlines for each wake-up signal. In the embodiment illustrated in FIG. 3, 21 bitlines are required. The use of many bitlines may require a large device area for load buffer memory, adding to processor cost. Logic and memory are implemented at the substrate of a typical semiconductor device. Busses are implemented in overlying metal layers. When many bitlines are used for a relatively small underlying logic or memory circuit, some of the underlying area may be unused because lack of accessibility by other bitlines for any other circuitry that would potentially be able to utilize that area.

Figure 4:
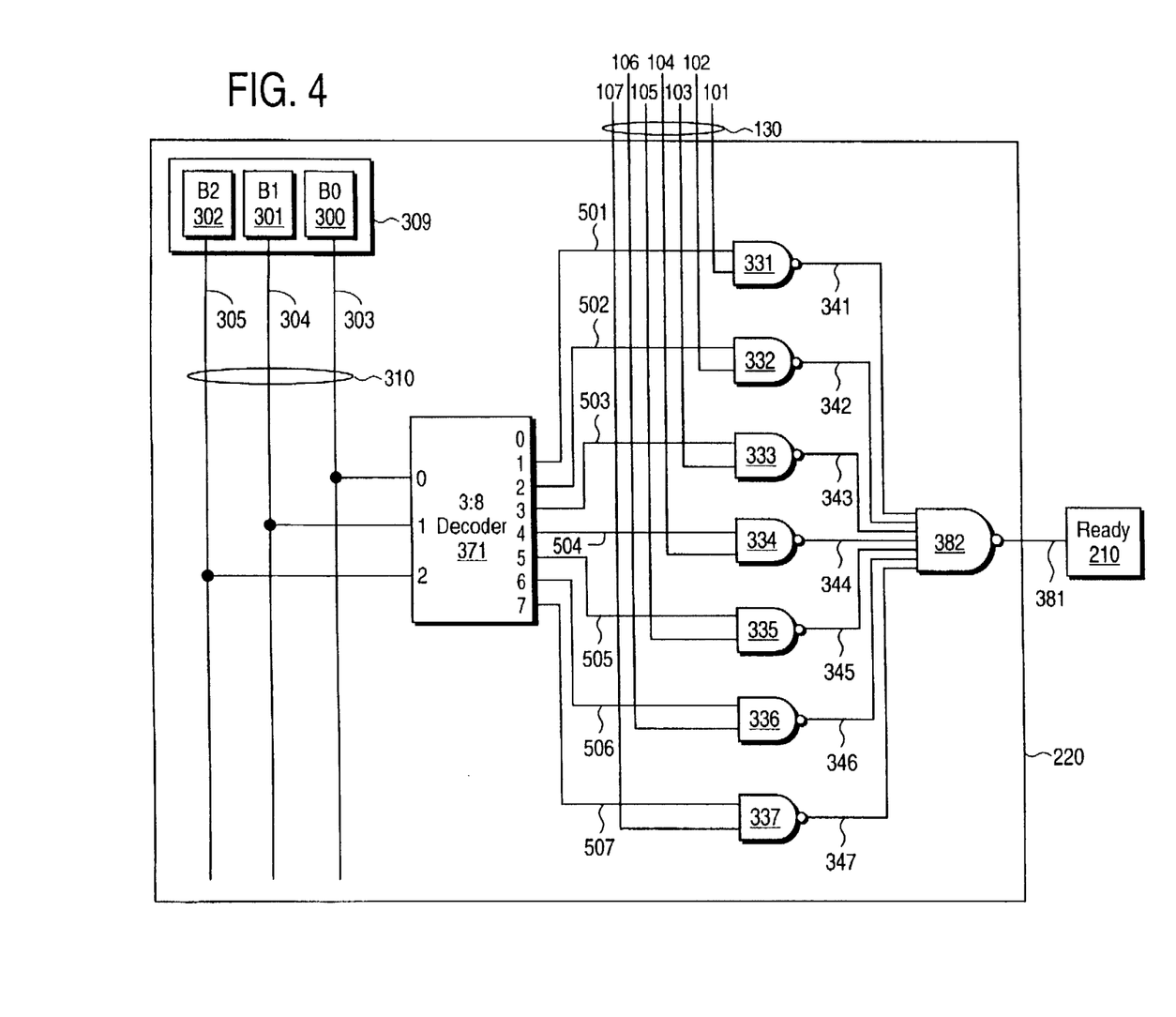
FIG. 4 illustrates one embodiment of wake-up logic using a compare logic to compare decoded wake-up signals directly with the block code.

FIG. 4 illustrates another embodiment of a wake-up logic. In this embodiment, the block code memory 309 contains bit cells 300–302, which store a three bit representation of the block code for that load entry in which bit cell 300 is the least-significant bit and bit cell 302 is the most-significant bit. The bit cells 300–302 are coupled to corresponding bit busses 303–305 which are collectively described as a block-code bus 310. The value stored in a memory cell is driven onto the corresponding bit bus. The block code bus 310 is coupled to inputs of a 3:8 decoder 371. The 3:8 decoder 371 drives one of the valid outputs 501–507 corresponding to the block code indicated on the block-code bus 310 according to well-known methods. The wake up bus 130 includes wake-up signals 101–107. In this embodiment, each of the wake-up signals 130 is represented on a single bus. Each of the seven wake-up signals indicate that blocking events corresponding to particular block codes are resolved. Wake-up signals 101–107 and corresponding VALID busses 501–507 are coupled to the inputs of corresponding NAND gates 331–337 which is coupled to corresponding NOT MATCH busses 341–347. Each of the NOT MATCH busses 341–347 indicate whether the block code matches a corresponding active wake-up signal. The NOT MATCH busses 341–347 are input to NAND gate 382 which drives a ready signal onto the ready bus 381. The ready bus 381 is coupled to ready cell 210 such that the status of the ready cell indicates that the load entry is ready for dispatch after the ready signal is asserted.

An advantage of the embodiment illustrated in FIG. 4 is that there is only one bitline for each wake-up signal. In this embodiment, 7 bitlines are required rather than the 21 bitlines required for the embodiment illustrated in FIG. 3. This allows the load buffer 220 to more efficiently use silicon area. A disadvantage is that the relative speed at which the ready signal may be determined. The total delay is approximately 4 gate delays (2 gate delays for the decoder and 1 gate delay for each NAND gate). A decoder has two gate delays because it typically uses one gate delay for inverters and one gate delay for AND gates which are coupled to different combinations of inverted and noninverted decoder inputs.

Figure 5:
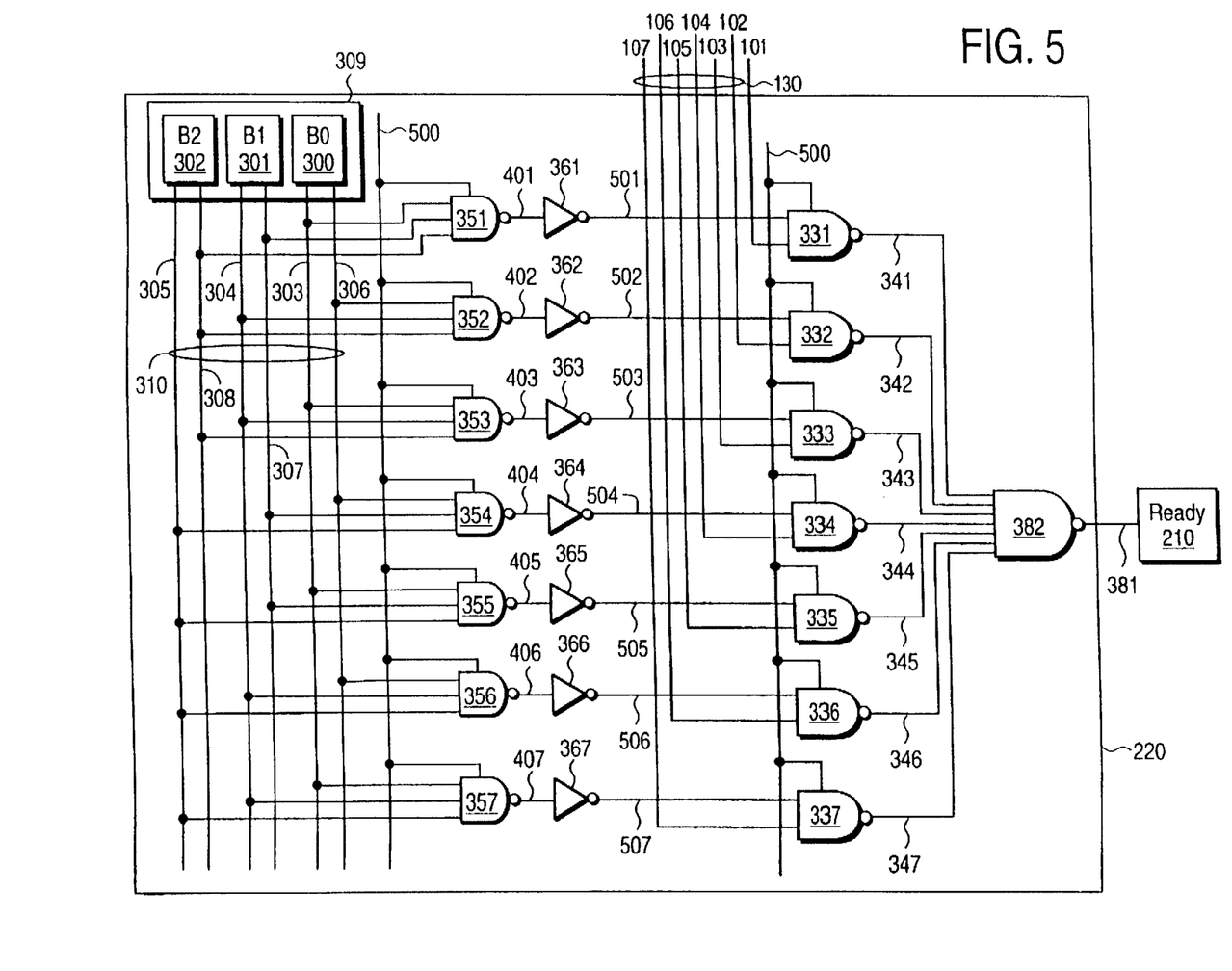
FIG. 5 illustrates one embodiment of the wake-up logic of the present invention using a dynamic decoder and AND gates to compare wake-up signals with the decoded block code.

FIG. 5 illustrates one embodiment of the wake-up logic of the present invention. In this embodiment, the block code memory 309 contains bit cells 300–302, which store a three bit representation of the block code for that load entry in which bit cell 300 is the least-significant bit and bit cell 302 is the most-significant bit. Each of these memory cells is coupled to a corresponding block-code bus 310, which includes bit busses 303–305 and bitbar busses 306–308. The value stored in a memory cell is driven onto the corresponding bit bus and the inverse of that value is driven onto the corresponding bitbar bus. For example, when bit cell 300 contains a zero, a zero will be driven onto the bit bus 303 and one will be driven onto the bitbar bus 306. One input from each pair of bit and bitbar signals is coupled to each of the NAND gates 351–357 such that each of the NAND gates 351–357 has a different combination of bit and bitbar signals. Each of the NOT VALID busses 401–407 is coupled to the output of a corresponding one of the NAND gates 351–357. Each of the NAND gates 351–357 are also coupled to a clock signal 500. When the clock signal 500 is high (precharge phase), the NOT VALID busses 401–407 are precharged. When the clock signal 500 is low (evaluate phase), the NOT VALID bus corresponding to the block code is discharged by the NAND gate. In another embodiment, the precharge is done while the clock signal 500 is low and the evaluate is done while the clock signal 500 is high. Although all the NAND gates 351–357 are similarly coupled, two examples are provided for illustration. First, NAND gate 351 receives bit bus 303, bitbar bus 307, and bitbar bus 308 such that NAND gate 351 will discharge the corresponding NOT VALID bus 401 if the block code is "001" during the evaluate phase. Second, NAND gate 352 receives bitbar bus 306, bit bus 304, and bitbar bus 308 such that NAND gate 352 will discharge the corresponding NOT VALID bus 402 if the block code is "010" during the evaluate phase. Each of the NOT VALID busses 401–407 are coupled to corresponding inverters 361–367 which drive a valid signal on corresponding VALID busses 501–507. The wake-up bus 130 includes wake-up signals 101–107. In this embodiment, each of the wake-up signals 130 is represented on a single bus. Each of the seven wake-up signals indicate that blocking events corresponding to particular block codes are resolved. Wake-up signals 101–107 and corresponding VALID busses 501–507 are coupled to the inputs of corresponding NAND gates 331–337 which is coupled to corresponding NOT MATCH busses 341–347. The NAND gates 331–337 receive the clock signal 500 which precharges the NOT MATCH busses 341–347. The precharge and evaluate phases are performed in a similar manner to that of NAND gates 351–357. The NOT MATCH busses 341–347 are input to NAND gate 382 which drives a ready signal onto the ready bus 381. The ready bus 381 is coupled to ready cell 210 such that the status of the ready cell indicates that the load entry is ready for dispatch after the ready signal is asserted.

The embodiment of the wake-up logic of the present invention described above has the advantage of efficient use of silicon because of the single bus wake-up signals and the advantage of a fast determination of the ready signal. By directly coupling the bit busses 303–305 and bitbar busses 306–308 of the block-code memory 309, the inverters (and the corresponding delay) typically used in a decoder are eliminated. The total delay is less than 3 gate delays rather than the 4 gate delays indicated by the gate count (1 gate delay each for the NAND gate and NOT gate) because of the speed optimization that may be done with a dynamic design. The design of the NAND gates 351–357 and the NAND gates 331–337 can be optimized for fast discharge at the cost of a slow precharge. Since all outputs of the NAND gates 351–357 and NAND gates 331–337 are precharged before ready determination, the precharge duration is not critical. However, the NAND gates 351–357 and NAND gates 331–337 corresponding to the block-code discharges its VALID bus output quickly because the design anticipates that the critical times are for discharges. In one embodiment, each cycle is divided into two parts. In the first part of the cycle, precharge occurs while the scheduler 120 determines which currently "ready" load-entry(ies) to issue in that cycle. In the second part of the cycle, the wake-up logic evaluates the new "ready" status of each load-entry. In one embodiment, the dynamic decoder of the present invention has approximately the same power dissipation as the alternative decoders described above.

Figure 6:
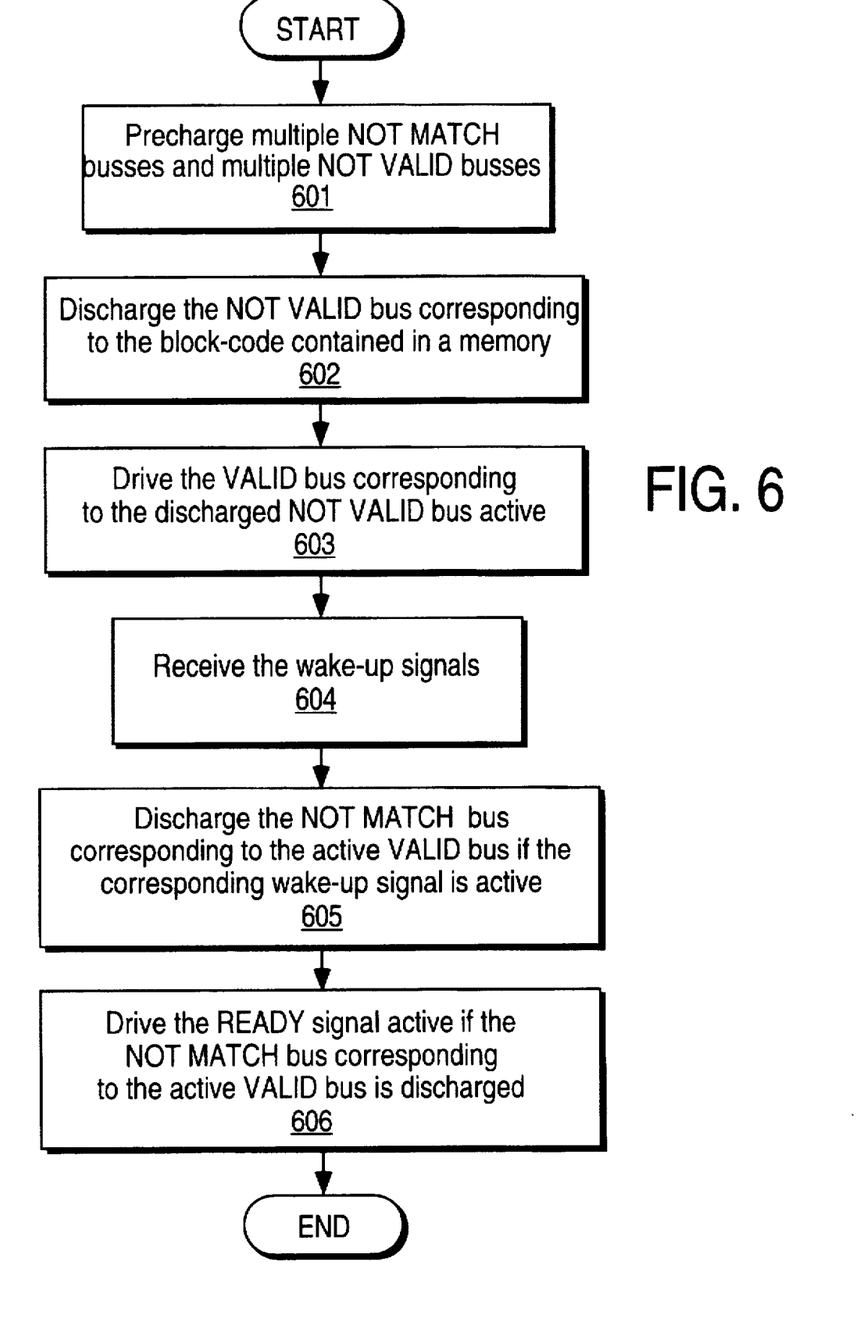
FIG. 6 illustrates one embodiment of the present invention for detecting which load operations are ready for dispatch.

FIG. 6 illustrates one-embodiment of the method of the present invention. In step 601, the NOT VALID busses of the dynamic decoder and the NOT MATCH busses are precharged. The precharge may be performed, for example, while the scheduler 120 schedules the currently "ready" pending loads for dispatch to memory. In step 602, the NOT VALID bus corresponding to the block-code contained in a memory is discharged. In step 603, the VALID bus corresponding to the discharged NOT VALID bus is driven active by an inverter, for example. The active VALID bus enables the match circuitry for a corresponding wake-up signal. In step 604, the wake-up signals are received. Each of these wake-up signals indicate that particular blocking conditions are resolved. In step 605, the NOT MATCH bus corresponding to the active VALID bus is discharged if the corresponding wake-up signal is active. In step 606, the READY signal is driven active if the NOT MATCH bus corresponding to the active VALID bus is discharged. The ready signal indicates that the load entry corresponding to the block-code is ready for dispatch to memory.

What is claimed is:

1. A wake-up logic for determining whether a blocked load operation corresponding to a memory is ready for dispatch, said wake-up logic comprising:

a dynamic decoder coupled to said memory having a plurality of first busses corresponding to a plurality of block-codes capable of being stored in said memory, each of said first busses indicating whether said memory contains a corresponding block code;

a dynamic match logic coupled to said plurality of first busses and a plurality of second busses, having a plurality of third busses corresponding to sets of said plurality of first busses and said plurality of second busses, each of said second busses indicating that a corresponding blocking condition is resolved, said dynamic match logic discharging one of said plurality of third busses that corresponds to an active said first bus and an active said second bus.

2. The wake-up logic of claim 1 wherein said dynamic decoder comprises:

a plurality of NAND gates, the inputs of each of said plurality of NAND gates being coupled to said memory and the output of each of said plurality of NAND gates being coupled to a corresponding one of a plurality of fourth busses, each of said plurality of fourth busses corresponding to one of a plurality of block-codes, one of said plurality of NAND gates discharging one of said plurality of fourth busses that corresponds to the block-code stored in said memory;

a plurality of precharge devices, each of said plurality of precharge devices being coupled to a corresponding said fourth bus, each of said plurality of precharge devices precharging said corresponding fourth bus; and a plurality of inverters, an input of each of said plurality of inverters being coupled to a corresponding said fourth bus, an output of each of said plurality of inverters being coupled to a corresponding said first bus.

3. The wake-up logic of claim 2 wherein said memory comprises a plurality of cells having a plurality of fifth busses and a plurality of sixth busses, each of said plurality of cells corresponding to a bit of the block-code having one of said plurality of fifth busses and one of said plurality of sixth busses, each of said plurality of fifth busses indicating the value of the corresponding bit, each of said plurality of sixth busses indicating the complement of the corresponding bit, each of said plurality of NAND gates being coupled to said plurality of cells by a either said fifth bus or said sixth bus corresponding to each cell, each of said plurality of NAND gates being coupled to a different combination of said plurality of fifth busses and said plurality of sixth busses.

4. The wake-up logic of claim 1 wherein said dynamic match logic comprises:

a plurality of NAND gates, an input of each of said plurality of NAND gates being coupled to a corresponding one of said plurality of first busses, an input of each of said plurality of NAND gates being coupled to a corresponding one of said plurality of second busses, and an output of each of said plurality of gates being coupled to a corresponding one of said plurality of third busses; and a plurality of precharge devices, each of said plurality of precharge devices being coupled to a corresponding one of said plurality of third busses, each of said plurality of precharge devices precharging said corresponding third bus.

5. The wake-up logic of claim 1 further comprising:

a NAND gate, a plurality of inputs of said NAND gate being coupled to each of said plurality of third busses, an output of said NAND gate being coupled to a fourth bus, said fourth bus indicating that the load corresponding to said memory is ready for dispatch.

6. The wake-up logic of claim 1, further comprising:

a gate, a plurality of inputs of said gate being coupled to each of said plurality of third busses, an output of said gate being coupled to a fourth bus, said fourth bus indicating that the load corresponding to said memory is ready for dispatch.

7. A wake-up logic for determining whether a blocked load operation corresponding to a memory is ready for dispatch, said wake-up logic comprising:

a dynamic decoding means coupled to said memory means having a plurality of first busses corresponding to each of a plurality of block-codes capable of being stored in said memory means, each of said plurality of first busses indicating whether said memory contains a corresponding block-code; and a dynamic matching means coupled to said plurality of first busses, a plurality of second busses, and a plurality of third busses, each of said second busses indicating that a corresponding blocking condition is resolved, each of said third busses indicating whether both the corresponding first bus and the corresponding second bus are active.

8. A processor having a load buffer comprising a plurality of memory elements and a plurality of wake-up circuits for determining whether a blocked load operation corresponding to a memory is ready for dispatch, each of said memory elements capable of storing one of a set of block-codes corresponding to a blocked load operation, each of said plurality of wake-up circuits being coupled to a corresponding memory element, each of said plurality of wake-up circuits comprising:

a dynamic decoder coupled to said corresponding memory element having a plurality of first busses corresponding to each of said plurality of block-codes, each of said plurality of first busses indicating whether said corresponding memory element contains a corresponding block-code; and a dynamic match logic coupled to said plurality of first busses and a plurality of second busses, having a plurality of third busses corresponding to sets of said plurality of first busses and said plurality of second busses, each of said second busses indicating that a corresponding blocking condition is resolved, said dynamic match logic discharging one of said plurality of third busses that corresponds to an active said first bus and an active said second bus.

9. The processor of claim 8, further comprising:

a plurality of gates having a plurality of inputs being coupled to said memory and the output of each of the plurality of gates being coupled to a corresponding one of the plurality of fourth busses corresponding to one of a plurality of block-codes, one of said plurality of gates discharging one of said plurality of fourth busses that corresponds to the block-code stored in said memory.

10. The processor of claim 8 wherein each said dynamic decoder comprises:

a plurality of NAND gates, the inputs of each of said plurality of NAND gates being coupled to said memory and the output of each of said plurality of NAND gates being coupled to a corresponding one of said plurality of fourth busses corresponding to one of a plurality of block-codes, one of said plurality of NAND gates discharging one of said plurality of fourth busses that corresponds to the block-code stored in said memory;

a plurality of precharge devices, each of said plurality of precharge devices being coupled to a corresponding one of said plurality of fourth busses, each of said plurality of precharge devices precharging said corresponding fourth bus; and a plurality of inverters, an input of each of said plurality of inverters being coupled to a corresponding fourth bus, an output of each of said plurality of inverters being coupled to a corresponding one of a plurality of first busses.

11. The processor of claim 10 wherein said memory comprises a plurality of cells having a plurality of fifth busses and a plurality of sixth busses, each of said plurality of cells corresponding to a bit of the block-code having one of said plurality of fifth busses and one of said plurality of sixth busses, each of said plurality of fifth busses indicating the value of the corresponding bit, each of said plurality of sixth busses indicating the complement of the corresponding bit, each of said plurality of NAND gates being coupled to said plurality of cells by a either said fifth bus or said sixth bus corresponding to each cell, each of said plurality of NAND gates being coupled to a different combination of said plurality of fifth busses and said plurality of sixth busses.

12. The processor of claim 11 wherein each said dynamic match logic comprises:

a plurality of NAND gates, an input of each of said plurality of NAND gates being coupled to a corresponding one of a plurality of first busses, an input of each of said plurality of AND gates being coupled to a corresponding one of a plurality of second busses, and an output of each of said plurality of gates being coupled to a corresponding third bus; and a plurality of precharge devices, each of said plurality of precharge devices being coupled to a corresponding third bus, each of said plurality of precharge devices precharging said corresponding third bus.

13. A method for determining whether a blocked load operation corresponding to a memory is ready for dispatch, said method comprising the steps of:

precharging a plurality of fourth busses and a plurality of third busses;

discharging one of said plurality of fourth busses corresponding to said block-code;

inverting each of said fourth busses to produce a signal on a corresponding first bus;

receiving a signal on a second bus; and discharging one of said plurality of third busses corresponding to both an active first bus and an active second bus.

14. The method of claim 13 further comprising the step of driving a fifth bus active when one of said plurality of third busses is discharged.

* * * * *